R. R. POTTER.
VEHICLE SPRING.
APPLICATION FILED MAY 26, 1914.
1,127,511.
Patented Feb. 9, 1915.
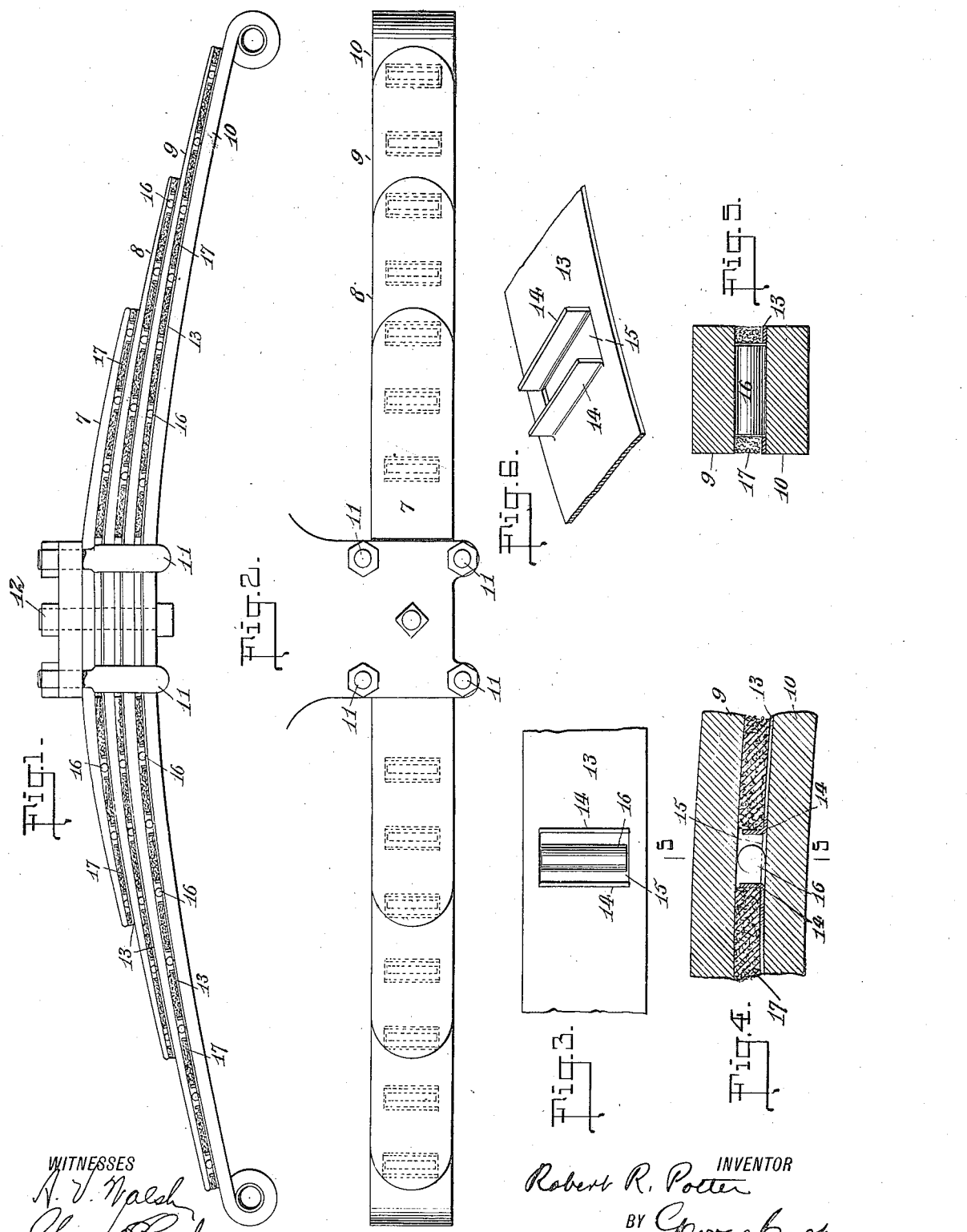
WITNESSES
INVENTOR
Robert R. Potter
BY George Cook
ATTORNEY

UNITED STATES PATENT OFFICE.

ROBERT R. POTTER, OF MOUNT VERNON, NEW YORK.

VEHICLE-SPRING.

1,127,511.  Specification of Letters Patent.  Patented Feb. 9, 1915.

Application filed May 26, 1914. Serial No. 840,992.

*To all whom it may concern:*

Be it known that I, ROBERT R. POTTER, a citizen of the United States, and a resident of Mount Vernon, in the county of Westchester and State of New York, have made and invented certain new and useful Improvements in Vehicle-Springs, of which the following is a specification.

My invention relates to an improvement in springs for use in connection with automobiles, wagons, carriages, and other vehicles, the object being to produce a device of this kind in which, by reason of its construction and arrangement of parts, the friction, caused by the movement of the several leaves one upon the other, will be to a great extent overcome, thereby materially adding to its resiliency and efficiency. As usually constructed, springs of this character are so built and arranged that each leaf contacts with the adjacent leaves throughout its entire length, so that when the weight, superposed thereon, tends to flatten or straighten the leaves of the spring, the friction caused by the moving and contacting leaves operates to rob the device of much of its resiliency, this being especially so after the spring has been in use a considerable length of time, and the contacting surfaces oxidized by exposure to the weather. For the purpose of avoiding this objection, I have separated the leaves by means of small rollers or balls, positioned along the length of the leaves, and so arranged that they will be allowed not only a rotating movement, but also a certain amount of travel on the leaves between which they are located, means being also employed to keep the same lubricated and to exclude the dust, dirt, or other foreign material from entering between the separated leaves.

My invention contemplates certain other novel features of construction and combinations of parts as will be hereinafter fully described and pointed out in the claims.

In the accompanying drawings, Figure 1 is a view in side elevation of a spring constructed in accordance with my invention. Fig. 2 is a plan view of the same. Fig. 3 is a plan view of a detached portion of one of the leaves of the spring, having the roller housing superposed thereon, and with the upper adjacent leaf of the spring, and intervening fabric, omitted. Fig. 4 is a sectional view through one portion of the spring showing two adjacent leaves with housing, fabric and roller intervening. Fig. 5 is a sectional view taken on the line 5—5 of Fig. 4, the roller being shown in elevation. Fig. 6 is a detached view in perspective of a portion of the housing.

By reference to these drawings, it will be seen that the spring comprises a number of leaves 7, 8, 9 and 10, the number thereof depending upon the resiliency or the stiffness desired. As usual, in this type of spring, the several leaves are bound or held together at about the center of their length by the yokes 11, and by a bolt 12 passing down through the center of the same. Between the adjacent leaves of the spring are located housings 13 preferably formed of thin sheet metal, such as mild steel, these housings usually extending the entire length of the respective leaf under which it is located, and in width approximately the same as the width of the leaf. At points along the length of each of these housings 13 the metal is slitted and turned upwardly, forming the vertical flanges 14, leaving an opening 15 extending partway across the leaf and of sufficient length to allow the roller a slight longitudinal travel as hereinafter described. In the opening 15 is contained a roller of a length slightly shorter than the opening, and of a diameter slightly greater than the height of the vertical flanges 14 plus the thickness of the metal of which the housing 13 is formed, the result being that when the parts are assembled as clearly illustrated in Fig. 4, the leaves of the spring are separated to the extent of the diameter of the roller 16, that is, to an extent slightly greater than the height of the vertical flanges 14 of the housing 13, the roller resting on the lower leaf of the spring, as for instance, No. 10, and on which roller rests the next upper leaf 9, said roller being located in the opening 15 and prevented from moving laterally by the edges of said opening, and allowed a certain length of travel longitudinally between the leaves equal to the distance between the vertical flanges 14—14, the upper edges of these vertical walls or flanges being below the under surface or side of the upper adjacent leaf and out of contact therewith.

In order to prevent the dust, dirt, or other foreign matter from finding its way into the opening 15 in the housing 13, I interpose between the latter and the next upper adjacent leaf of the spring, a strip of cloth or fabric 17, these strips extending from about the center of the spring where the yokes 11 clamp the same, outwardly to about the end of the respective leaf under which it is located, openings being cut in these strips of fabric to allow of the projection of the vertical walls 14 of the housing 13 through them, and also permitting the rollers 16 to contact with the lower surface of one leaf and under surface of the upper adjacent leaf, these strips of fabric entirely overlapping or covering the housings with the exception, as before stated, of the openings 15 in the latter. If desired, the opening 15 may be filled with a grease or other lubricant, such being contained within the receptacle formed by the vertical walls 14 of the housing and the ends of the opening in the fabric 17, the leaves below and above the housing forming the bottom and the top of this receptacle.

While I have described the use of rollers 16 in connection with my improved spring, it will be understood, of course, without further description or illustration, that balls might be substituted therefor with good results, although I prefer the use of rollers, as such provide a much greater bearing surface for the leaves of the spring.

From the foregoing it will be understood that when the spring is constructed as above described, the leaves are held out of frictional contact with each other, and as each leaf is practically mounted upon a rotatable bearing, the full amount of resiliency is obtained therefrom, the surfaces thereof, contacting with the roller bearing, being constantly kept lubricated while at the same time the dust and dirt is prevented from entrance thereto.

What I claim is:—

1. A spring of the character described comprising a plurality of superposed leaves, a plurality of rollers spaced apart and located between said leaves to provide bearings therefor, and housings located between said leaves, said housings being provided with openings extending partway across the same, the metal from said openings being bent upwardly to form flanges, said rollers fitting in said flanged openings of the housings.

2. A spring of the character described comprising a plurality of superposed leaves, a plurality of rollers spaced apart and located between said leaves to provide bearings therefor, housings located between said leaves and provided with openings in which are contained said rollers, a fabric located between said leaves and around said rollers for excluding foreign substances therefrom.

3. A spring comprising a plurality of superposed leaves, a plurality of rollers located between the adjacent leaves and affording bearings therefor, strips of metal provided with walled openings located between said leaves and in which openings are contained said rollers, and strips of fabric located between said leaves and around said openings in the housings for excluding foreign substances therefrom.

Signed at Mount Vernon in the county of Westchester and State of New York this 20th day of May, A. D. 1914.

ROBERT R. POTTER.

Witnesses:
FRANCIS WEINHEIMER,
DAVID L. EMMELUTH.